(12) United States Patent
Weygandt et al.

(10) Patent No.: US 10,057,082 B2
(45) Date of Patent: Aug. 21, 2018

(54) SYSTEMS AND METHODS FOR IMPLEMENTING EVENT-FLOW PROGRAMS

(71) Applicant: eBay Inc., San Jose, CA (US)

(72) Inventors: Jon Birchard Weygandt, Los Gatos, CA (US); Jagori Somadder, San Jose, CA (US); Rajiv Karuthethil, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 254 days.

(21) Appl. No.: 14/580,114

(22) Filed: Dec. 22, 2014

(65) Prior Publication Data

US 2016/0182251 A1 Jun. 23, 2016

(51) Int. Cl.
*H05K 7/10* (2006.01)
*H04L 12/40* (2006.01)
*G06F 13/40* (2006.01)
*G06F 17/30* (2006.01)

(52) U.S. Cl.
CPC .... *H04L 12/40163* (2013.01); *G06F 13/4022* (2013.01); *G06F 17/30412* (2013.01); *G06F 17/30516* (2013.01); *H04L 12/40065* (2013.01); *H04L 12/40123* (2013.01)

(58) Field of Classification Search
CPC ... G06F 9/3851; G06F 9/5044; G06F 11/0715
USPC .................................. 345/506, 505; 710/301
See application file for complete search history.

(56) References Cited

U.S. PATENT DOCUMENTS

| | | | | |
|---|---|---|---|---|
| 4,229,790 A | * | 10/1980 | Gilliland | G06F 9/3838 711/169 |
| 6,864,892 B2 | * | 3/2005 | Lavelle | G09G 5/36 345/503 |
| 6,934,304 B2 | * | 8/2005 | Homer | H04J 3/0608 370/510 |
| 7,724,784 B2 | * | 5/2010 | Perng | H04L 65/607 370/532 |
| 2004/0263520 A1 | * | 12/2004 | Wasserman | G06T 1/60 345/506 |
| 2005/0132107 A1 | * | 6/2005 | Cornet | G06F 7/02 710/71 |
| 2007/0239881 A1 | * | 10/2007 | Schneider | H03M 7/30 709/231 |
| 2008/0143730 A1 | * | 6/2008 | Lindholm | G06F 9/5044 345/501 |
| 2009/0027383 A1 | * | 1/2009 | Bakalash | G06F 9/5044 345/419 |
| 2009/0220229 A1 | * | 9/2009 | Markus | H04J 3/1652 398/50 |

(Continued)

*Primary Examiner* — Faisal M Zaman
(74) *Attorney, Agent, or Firm* — Schwegman Lundberg & Woessner/eBay

(57) ABSTRACT

Described are systems and methods for processing data streams, e.g., to implement event flow programs in a manner that facilitate the co-existence of multiple independent event flow programs in a multi-tenant deployment. In various embodiments, an input data stream is partitioned into multiple primitive data streams that can be processed independently from each other, and portions of two or more primitive data streams are routed and combined to form a complex data stream, facilitating complex processing tasks that take the two or more primitive data streams as input.

19 Claims, 6 Drawing Sheets

(56) References Cited

U.S. PATENT DOCUMENTS

| | | | | |
|---|---|---|---|---|
| 2009/0319755 | A1* | 12/2009 | Montvelishsky | G06F 15/8015 712/17 |
| 2010/0208751 | A1* | 8/2010 | Desai | H04L 12/2801 370/474 |
| 2010/0318619 | A1* | 12/2010 | Meijer | G06Q 10/10 709/206 |
| 2011/0069225 | A1* | 3/2011 | Routhier | H04N 7/122 348/443 |
| 2011/0113047 | A1* | 5/2011 | Guardalben | G06F 17/30905 707/754 |
| 2011/0150006 | A1* | 6/2011 | Unkel | H04N 13/0055 370/503 |
| 2012/0137018 | A1* | 5/2012 | Uhlig | G06F 11/004 709/231 |
| 2012/0278678 | A1* | 11/2012 | Kruglick | H04L 1/0056 714/752 |
| 2013/0301694 | A1* | 11/2013 | Olgaard | H04B 7/0413 375/224 |
| 2014/0092900 | A1* | 4/2014 | Kisela | G06F 13/385 370/389 |
| 2014/0129824 | A1* | 5/2014 | Paris | H04L 9/0637 713/150 |
| 2015/0026431 | A1* | 1/2015 | Vorbach | G06F 13/385 711/214 |
| 2016/0154710 | A1* | 6/2016 | Wade | G06F 11/1469 714/19 |
| 2017/0180272 | A1* | 6/2017 | Bernath | H04L 49/3054 |

* cited by examiner

SYSTEMS AND METHODS FOR IMPLEMENTING EVENT-FLOW PROGRAMS

TECHNICAL FIELD

The present invention relates generally to systems and methods for implementing event-flow programs. Various embodiments relate, more particularly, to complex event processing in a multi-tenant deployment.

BACKGROUND

With the advent of "big data"—generated or captured, e.g., on the web on social networking sites and e-commerce platforms, with mobile devices, and with the "Internet of things"—computing systems of ever-increasing performance are being developed to facilitate monitoring and processing the vast amounts of data to derive meaningful, actionable insights therefrom, often in real-time. Example applications include tracking and correlating large numbers of financial (e.g., credit-card) transactions for the purpose of fraud detection; gathering information about online shoppers to present timely offers and promotions; and monitoring business processes or computing systems in large enterprises to detect or foresee, e.g., supply shortages, delivery delays, or capacity problems. The event-flow (or data-flow) programming paradigm is generally well-suited to solve such high-volume, real-time data-processing problems.

An event-flow program can be modeled as a directed graph of data flowing between discrete operations or processes (the nodes of the graph) that collectively correspond to a larger, more complex processing task. The program may be implemented by a plurality of compute modules (e.g., computers or computer systems) that are wired together in a network to perform the complex processing tasks. To change such a program, a large-scale reconfiguration (or re-wiring) of the network is generally undertaken. While such a re-wiring may be feasible in systems that implement the event-flow program of a single tenant, it can cause unacceptable disruptions in a computational infrastructure shared by multiple small, unique event-flow programs run by multiple tenants. Even in single-tenant deployments, the temporary interruption of the existing event-flow program to implement a new version can be undesirable.

One approach to addressing the aforementioned problem is to dispense with the direct connections between the compute modules implementing the various compute nodes and, instead, channel all data through a central data bus from which the individual compute modules extract the data of interest to them and to which they can output any new data resulting from their respective processing tasks. In this manner, nodes can be inserted into or deleted from an existing event flow without affecting (or only minimally affecting) the other nodes in the event flow. The implementation of this approach is, however, challenging when the amount of data exceeds the bandwidth of the central data bus, the bandwidth of the interfaces of the compute modules with the bus, and/or the processing capacity of the individual compute modules, as is often the case in "big data" applications.

BRIEF DESCRIPTION OF THE DRAWINGS

Various embodiments are illustrated herein with reference to the accompanying drawings, in which.

DETAILED DESCRIPTION

Figure 1:
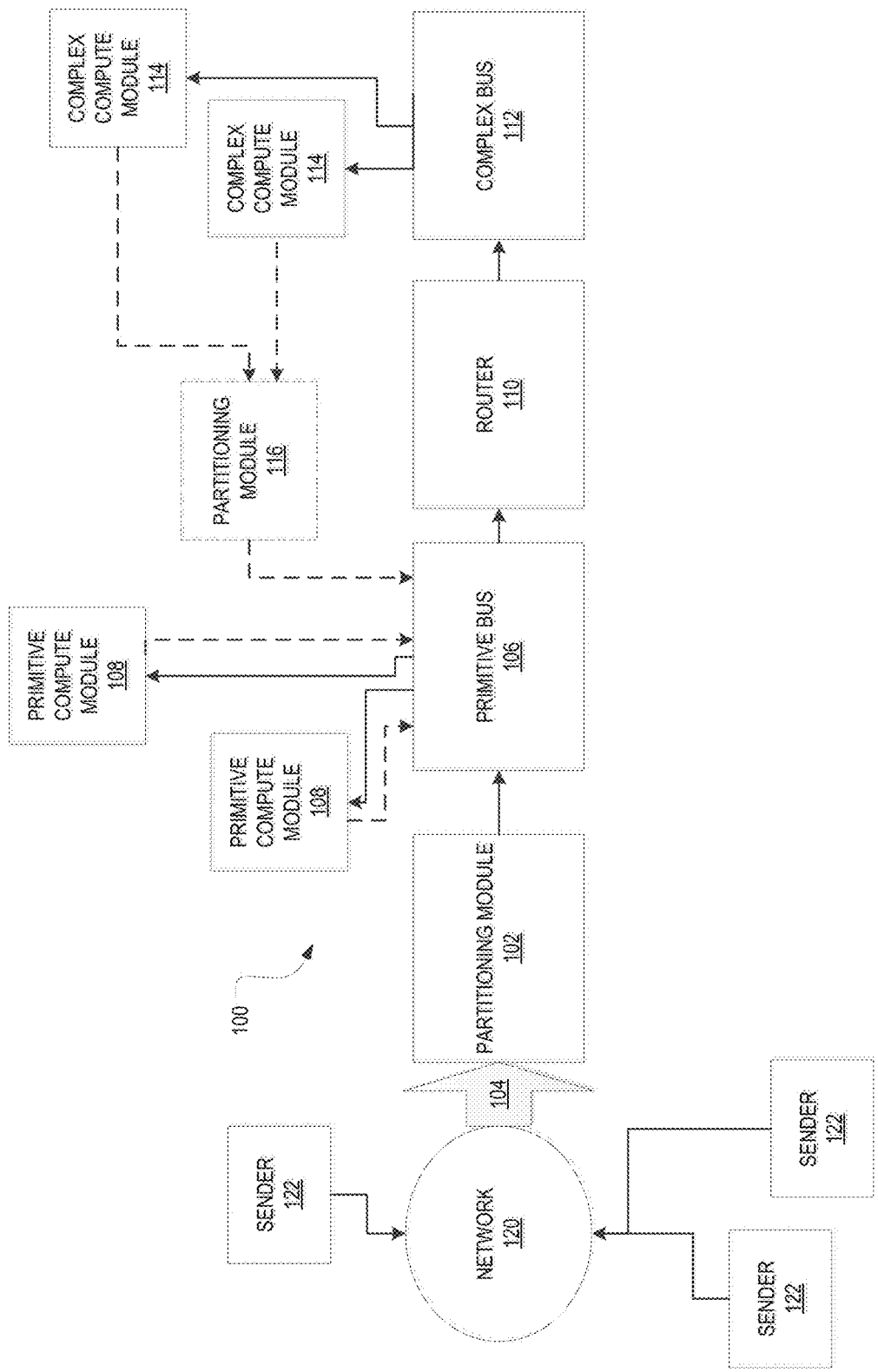
FIG. 1 is a block diagram illustrating a two-tier architecture of an example data-stream processing system, in accordance with various embodiments.

In the following description, example embodiments and numerous details are set forth for the purpose of explanation. However, various modifications to the example embodiments will be readily apparent to those skilled in the art, and the generic principles defined herein may be applied to other embodiments and applications, and practiced without the use of these specific details, without departing from the scope of the invention. Thus, the present disclosure is not intended to be limited to the embodiments shown, but is to be accorded the widest scope consistent with the principles and features disclosed herein. Furthermore, certain well-known structures and processes are omitted from the following description and accompanying drawings in order not to obscure the description of the invention with unnecessary detail.

Described herein are systems and methods for implementing event-flow programs in a manner that facilitate the co-existence of multiple independent programs in a multi-tenant deployment, allowing changes to be made to existing programs, and/or new programs to be deployed, individually without interruption of other tenants' programs. In accordance with various embodiments, the system is scalable to accommodate incoming event data streams too large to be carried on an individual physical communication channel (as limited, e.g., by the bandwidth of a physical transport or network interface) and/or too large to be processed by an individual physical compute module, generally requiring the partitioning of the data stream into a plurality of sub-streams. (The attribute "physical" is herein used with reference to the hardware components of a computing system, which are inherently subject to capacity limitations (e.g., limited bandwidth or processing power). By contrast, the attribute "logical," as used hereinafter, refers to individual system functionalities, and denotes, for each logical system component, the entirety of physical system components collectively implementing its functionality. As such, a logical system component is in principle not capacity-limited, as physical components may be added to increase its capacity as needed. However, note that, while scaling a particular logical system component may become straightforward in accordance with various embodiments, implementing that logical system component in the first place may be contingent upon devising a suitable system architecture, that is, a suitable configuration of the system's physical components and their interconnections.)

More specifically, various embodiments are adapted to handle "multi-dimensional" data streams, which are herein understood to be data streams that can be partitioned based on multiple different criteria (corresponding to the different dimensions), and whose partitioning based on multiple different criteria is, in fact, desirable in a particular application context, e.g., to accommodate the needs of different event-flow programs and/or tenants. Consider, for example, a system designed to monitor the health of a large enterprise computer system providing online services, such as, e.g., an e-commerce platform. Such a computer system may include web servers, back-end servers, databases, network devices, etc., whose operation and performance may be tracked using metrics such as, e.g., central-processing-unit (CPU) usage, memory usage, frequency of disk reads, frequency of web requests/responses (e.g., measured in transactions per second), latency of responses to web requests, frequency of errors, rate of data transfer (measured, e.g., in bytes per second), bandwidth usage, frequency of database access, etc. If all those metrics, for all the devices (which may be tens, hundreds, thousands, or tens of thousands of devices, or even more) cannot be sent over an individual physical communication channel, a "natural" way to partition the data may be to divide it based on the metric; for instance, CPU data may be sent over one channel, memory usage over a second channel, frequency of disk reads over a third channel, etc. Alternatively, the data may be divided up based on the monitored entity, such that all of the data measuring the operation of one monitored device or group of devices is sent over the first communication channel, the data from a second (group of) monitored device(s) is sent over the second channel, and so forth. The data may also be partitioned based on the overall system functionality or the particular software application to which it relates, the department within the enterprise or the data center from which it originates, or in other ways. In this example, the metric, monitored entity, etc. correspond to the different dimensions of the data stream. To provide another example, a stream of weather-related data may be partitioned, e.g., based on the metric (e.g., temperature, pressure, precipitation, wind speed, etc.), geographic region (e.g., country, state, or city), or type of environment (e.g., mountains, coast, plains, etc.). Suitable ways of partitioning large data streams will be readily apparent to those of ordinary skill in the art from the context of the particular application or type of data.

Once a data stream has been partitioned into multiple sub-streams, these sub-streams can be individually processed by a plurality of logical compute modules, each of which connects (by definition) to one of the sub-streams to perform a discrete processing task on the data of that sub-stream. For example, if computer-system monitoring data is partitioned based on the metric, a logical compute module connected to a sub-stream including CPU data may be configured to compare CPU usage against a pre-set threshold, and issue an alert when that threshold is exceeded. Processing tasks that involve data from multiple sub-streams (hereinafter also referred to as "complex event processing (CEP)" tasks), on the other hand, cannot be implemented without further infrastructure. To compute the ratio of CPU usage and transactions per second (hereinafter also "cpu/tps"), for instance, partitioning based on the metric is not suitable. Partitioning the data, instead, based on the monitored entity may facilitate cpu/tps computations, but not comparisons between CPU usages of different monitored entities. As this example illustrates, it may not be possible to identify a partitioning scheme, i.e., select a dimension along which to partition the data, that suits all purposes. Indeed, in multi-tenant systems, one partitioning rarely fits all tenant's needs. In many practical scenarios, however, one of the dimensions of the data stream lends itself to a "natural" partitioning of the data in that it captures a large fraction of processing tasks and their data uses (e.g., 80% or more). Various embodiments take advantage of this fact by providing a two-tier architecture in which the data stream is first partitioned in one way (e.g., the "natural" way), and data from two or more sub-streams is then re-combined as needed to support CEP tasks.

FIG. 1 provides a conceptual overview of the two-tier architecture of an example data-stream processing system 100, in accordance with various embodiments, for implementing event flow programs that involve CEP tasks. The system 100 includes a partitioning module 102 that receives an incoming multi-dimensional data stream 104 as input and divides that data stream along one dimension (or, alternatively, along two or more dimensions) into a plurality of sub-streams, hereinafter referred to as "primitive data streams." Each primitive data stream may include multiple sub-primitive data streams, which may differ in the remaining dimensions that were not subject to the partitioning. Consider, for example, an incoming two-dimensional data stream 104 that includes several performance metrics for many hardware components within a large computer system. If the partitioning module 102 divides this incoming data stream 104 by metric, the primitive data stream for each metric may include multiple sub-primitive data streams, one for of the monitored hardware components. Conversely, if the partitioning module 102 divides the incoming data stream 104 by monitored entity, each primitive data stream may include multiple sub-primitive data streams for the various metrics. A sub-primitive data stream is generally immutable once created, i.e., data can be read from the sub-primitive data stream, but not be written thereto. By contrast, primitive data streams can be enhanced by adding new sub-primitive data streams that fit within the partitioning scheme. For example, if a primitive data stream carries data for a particular metric for multiple monitored entities, the average of that metric across the entities may be computed and placed within the primitive data stream as a new sub-primitive data stream.

The partitioning module 102 outputs the primitive data streams to a "primitive bus" 106. The primitive bus 106 is a logical bus (within the meaning of "logical" as explained above) that is generally implemented using multiple physical communication channels. For example, in some embodiments, each primitive data stream is carried on its own, separate physical communication channel. In other embodiments, an individual physical communication channel may carry a group of multiple primitive data streams, as explained in more detail below. (However, a primitive data stream is not split among multiple physical communication channels. Rather, each primitive data stream is carried in its entirety on a single physical communication channel; the partitioning of the incoming data stream serves to create primitive data streams that do not exceed the bandwidth limitations of the physical communication channels employed.)

The system 100 further includes one or more "primitive compute modules" 108 connected to the primitive bus 106. The primitive compute modules 108 implement discrete processing tasks within an event-flow program (e.g., by carrying out suitable algorithms), each taking a single primitive data stream as input and processing that primitive data stream, independently of the other primitive data streams, e.g., to produce an output stream that may be written back onto the primitive bus 106 (e.g., as a new sub-primitive data stream within the same primitive data stream or a different primitive data stream) or to a database, email system, or other system component. In order to perform CEP tasks, i.e., processing tasks that take multiple primitive data streams as input, these primitive data streams are routed, via a router 110, to a "complex bus" 112 containing one or more "complex data streams." The complex bus 112 is a logical bus that may (but need not) be implemented using multiple physical communication channels (depending on the number of complex data streams). A complex data stream, as used herein, combines data from two or more primitive data streams, generally following some filtering of the primitive data streams to reduce the total amount of data from the multiple primitive streams in order to stay within the available bandwidth of the physical communication channel carrying the complex data stream. The system 100 includes one or more "complex compute modules" 114 connected to the complex bus 112. The complex compute modules 114 are configured to perform CEP tasks, each taking a complex data stream as input and processing that complex data stream independently of any other complex data streams. The results of the processing may be output to the primitive bus 106 as new sub-primitive data streams within existing or new primitive data streams (that usually either fit within the original partitioning scheme or enhance or generalize the original scheme, as explained in more detail with respect to FIG. 3). A partitioning module 116 may be placed at the output of the complex compute modules 114 to ensure a balanced distribution of the newly created primitive data streams across the existing physical communication channels implementing the primitive bus 106. Both the primitive compute modules 108 and the complex compute modules 114 are logical compute modules (within the meaning of "logical" as explained above), each of which may be implemented using one or more physical compute modules, or portions of one or more physical compute modules, as explained further below. The various components of the system 100 and their interactions will now be described in more detail.

Still with reference to FIG. 1, the partitioning module 102 may be implemented by one or more computers (e.g., general-purpose programmable computers each including at least one processor and associated memory, as well as a network interface) that are connected, via a suitable network 120, to the senders 122 from which the data that collectively constitutes the multi-dimensional incoming data stream 104 originates. For instance, if the data includes operational and performance metrics of an enterprise computer system, the senders 122 may correspond to the various monitored network components (computers, network devices, etc.), and the network 120 may correspond to an enterprise intranet through which the senders 122 communicate with the partitioning module 102. Or, if the data constitutes weather data, the senders 122 may be sensors (temperature sensors, pressure sensors) or other devices distributed across a geographic region that stream data over the internet, from which it may be retrieved by the partitioning module 102. The partitioning module 102 may connect to the various senders 122 using a round-robin-style, stateful, or other connection method. In various embodiments, the partitioning module 102 includes multiple physical components that route the incoming data to the appropriate primitive data stream on the primitive bus 106. In some embodiments, the input data stream 104 is sufficiently small to be within the bandwidth limitations of a single network device and to be handled by a single physical component implementing the partitioning module 102, but partitioning is used nonetheless to accommodate the much larger data stream that may be generated by the compute modules 108 and/or 114.

The input data stream 104 may be partitioned based on a partitioning key that is explicit or implicit in the data. For example, in some embodiments, data is sent in the form of data packages that include each a header (specifying various metadata) and a load (containing the data itself). The partitioning key may be directly specified by the sender 122 of the data in the header; this implementation may be feasible in embodiments where the senders 122 and the data-stream processing system 100 are under the control of the same operator (such as, e.g., a single enterprise), such that data generation and processing are actively coordinated. In other embodiments, the partitioning module 102 includes analytical functionality to partition the incoming data based on the data itself, such that the senders 122 can transmit data independently without knowledge of the partitioning scheme employed in the processing system 100. For example, the system 100 may be configured to process weather data retrieved through the internet through thousands of independent sources, and the partitioning module 104 may pre-process the data to determine which metric (e.g., temperature, pressure, etc.) each item of data relates to, and partition the data based on the metric. The data may generally be partitioned along one or more dimensions. For example, operational data of a web-server farm may be partitioned based on metric or, alternatively, host (i.e., the web server or group of servers being monitored). However, if partitioning of the overall incoming data stream along one dimension results in sub-streams that are still too large to be carried on individual physical buses, the incoming data may be sub-divided based on multiple dimensions, e.g., by both metric and host (such that, for instance, one bus carries CPU data for host 1, another bus carries memory data for host 1, a third bus carries CPU data for host 2, etc.).

Figure 2:
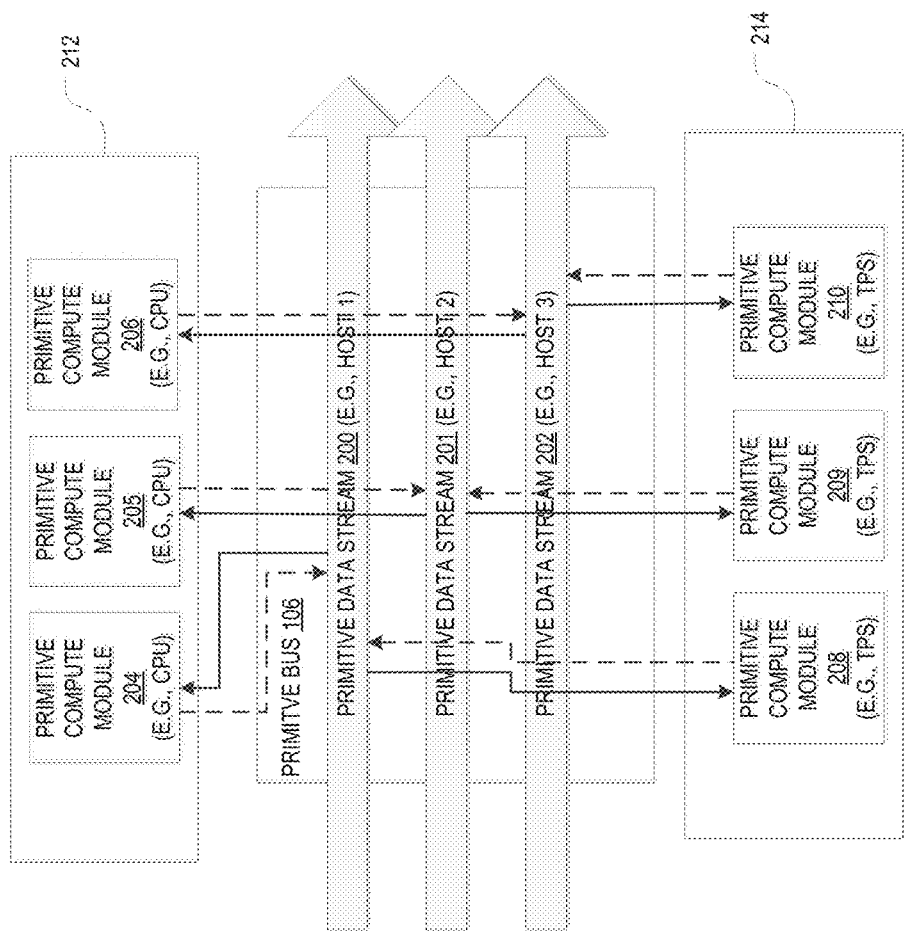
FIG. 2 is a block diagram illustrating in more detail the interaction between the primitive compute modules and the primitive bus of FIG. 1, in accordance with one example embodiment.

FIG. 2 illustrates in more detail the interaction of the primitive compute modules 108 with the primitive bus 106. Herein, the primitive bus 106 is depicted as carrying three primitive data streams 200, 201, 202. Of course, as will be readily understood by those of ordinary skill in the art, the number of primitive data streams is usually much larger, and generally includes any number of two or more primitive data streams. A plurality of primitive compute modules are each connected to one of the primitive data streams. For example, FIG. 2 depicts six primitive compute modules 204, 205, 206, 208, 209, 210 connected to the three primitive data streams 200, 201, 202. Different primitive compute modules may be configured to perform different discrete processing tasks on the same primitive data stream, the same processing task on different primitive data streams, or different processing tasks on different primitive data streams.

Assuming, for example, that the incoming data stream includes operational data of a web-server farm partitioned by host, primitive compute module 204 may be configured to process CPU data of host 1, carried in primitive data stream 200, and primitive compute module 208 may be configured to process web-transaction data (e.g., tps) of host 1, also carried in primitive data stream 201. Similarly, primitive compute modules 205, 206 may be configured to process CPU data of hosts 2 and 3, respectively, and primitive compute modules 209, 210 may be configured to process web-transaction data of hosts 2 and 3, respectively. A single node of an event-flow program (corresponding to a particular processing task, irrespective of the amount of data it operates on) may be implemented collectively by multiple primitive compute modules that carry out the same processing functionality, but operate on different primitive data streams. For instance, primitive compute modules 204, 205, 206 collectively correspond to a node 212 for processing the CPU data of the incoming data stream, independently for each of the primitive data streams 200, 201, 202. Similarly, primitive compute modules 208, 209, 210 correspond to a node 214 for processing the web-transaction data of the incoming data stream, likewise independently for each of the three primitive data streams. Note, however, that not each of the nodes, or processing tasks, within an event-flow program necessarily applies to all of the incoming data; accordingly, a node need not necessarily include a primitive compute module for each of the primitive data streams. For example, it is possible that CPU data are processed only for host 1, and tps data only for host 2.

Different primitive compute modules may be implemented by different physical compute modules, or groups thereof (e.g., groups of interconnected computers). Alternatively, different primitive compute modules may, in some embodiments, share physical compute modules. For example, multiple primitive compute modules for different processing tasks performed on the same primitive data stream (e.g., primitive compute modules 204, 208 for CPU and web-transaction data of host 1) may be implemented as different processes run on the same computer. Even primitive compute modules operating on different primitive data streams may, in certain embodiments, be implemented on the same physical compute module, e.g., in cases where a single physical communication channel connected to the physical compute module carries more than one primitive data stream.

The interaction between the primitive bus 106 and the primitive compute modules 108 (e.g., modules 204-210) generally follows a publish/subscribe pattern. The various primitive compute modules 108 do not communicate directly with each other, but each primitive compute module obtains input data from the primitive bus by connecting or "subscribing" to one of the primitive data streams, and "publishes" any output data that is used by primitive compute modules downstream in the event-flow program on the primitive bus, either by writing it as a new sub-primitive data stream to the primitive data stream from which the input data was retrieved or, alternatively, by creating a new primitive data stream. Any newly created primitive data stream is usually carried on the same physical communication channel as the input primitive data stream, to take advantage of the already existing connection between the physical compute module implementing the primitive compute module and the physical communication channel carrying the primitive data stream. However, it is also possible to include a partitioning module at the output of the primitive compute modules to alter the distribution of output data streams across the various communication channels. In various embodiments, each primitive compute module "listens to" the entire primitive data stream via the network interface or receiver of the implementing physical compute module; the received primitive data stream may then be pre-processed to filter out and discard or ignore any data not relevant to the particular processing task implemented by the primitive compute module. The bandwidth of the network interface or receiver imposes a limitation on the allowable data rate of the primitive data stream (independently of any bandwidth limitation of the physical communication channel carrying that primitive data stream).

The publish/subscribe system can be implemented in various ways, using different types of hardware and software components for the primitive bus. In some embodiments, the primitive bus includes a network switch that sends the various primitive data streams over different physical transports (such as different Ethernet or other cables) or different wireless communication channels, each having a different multi-cast address associated therewith. (Note that even a wireless communication channel is a "physical communication channel" as used herein because, though it does not require a physical transport, it does use tangible hardware components, such as sender and receiver devices, which have associated capacity limitations.) Each primitive compute module "listens on" one of the multi-cast addresses, i.e., connects to the physical transport or wireless channel associated with that multi-cast address. In this embodiment, primitive compute modules that listen on different multi-cast addresses are generally implemented on different physical compute modules. Further, in the event that the data associated with a single multi-cast address includes multiple primitive data streams, a primitive compute modules listening on this multi-cast address may filter the incoming data to isolate the primitive data stream whose data it is configured to process. Publish/subscribe systems using multi-cast addresses can be straightforwardly implemented by those of ordinary skill in the art without undue experimentation, using, e.g., commercially available hardware and/or software.

In some embodiments, the primitive bus is implemented with a messaging server (or "hub") (or a group of multiple such servers acting in concert), e.g., including suitable message-oriented middleware (MOM). The messaging server distributes data (in the form of messages) based on associated "topics" or, in some embodiments, a hierarchy of topics and sub-topics (the latter sometimes being referred to as "partitions" of the topic). Each topic or sub-topic (generally the lowest level within the hierarchy) corresponds to a primitive data stream of the present disclosure. Each primitive compute module subscribes to one of the topics when connecting to the messaging server, and may then pre-process the data to retrieve the sub-topic of interest. The data may be sent over one or more physical transports or wireless communication channels, and each transport or channel may carry data related to one or more of the topics. To provide a specific example, a messaging server may output data over five different transports, each sending data for twenty different topics, resulting in a hundred different topics, and each topic may be further sub-divided into a hundred sub-topics (each corresponding to a primitive data stream), resulting in ten thousand sub-topics, or primitive data streams, in total. In this embodiment, primitive compute modules that subscribe to different topics carried on the same physical transport may (but need of course not) be implemented on the same physical compute module. Techniques for implementing a publish-subscribe system with one or more messaging servers and/or suitable MOM are known to those of ordinary skill in the art, and suitable hardware and/or software components are commercially available.

In some embodiments, the primitive bus is implemented by message-oriented-middleware that (unlike conventional commercial systems) facilitates hub-side filtering to support a virtually infinite number of topics, or to dispense with topics entirely and instead use attributes of the data to describe a subscription. As explained further below, the primitive bus and complex bus may, in this case, be carried by the same physical cluster of machines. However, the computational modules still share the general attributes of primitive and complex modules in accordance herewith, and the computational pattern described herein is still applicable.

Additional implementations of the publish-subscribe architecture underlying the primitive bus 106 and its connections to the primitive compute modules 108 may occur to those of ordinary skill in the art.

The primitive compute modules 108 may generally process the primitive data streams in any desired manner, e.g., creating new and different primitive or sub-primitive data streams. Examples of compute modules with specific functionalities include rules modules, aggregation modules, and comparison modules. A rules module may monitor the data for a certain specified condition, and take a specified action when the condition is met. For instance, when a certain metric (such as, e.g., CPU usage) exceeds a specified threshold, the rules module may create a new (sub-)primitive data stream, trigger an alert, send an email to a specified user (e.g., a network administrator), save the value of the metric (or related data) in a database, and/or stream data to a user interface. An aggregation module may collect and temporarily store the values of a metric over a certain time interval to perform a computation on the aggregated data, e.g., to sum or average the data over the time interval. Similarly, a comparison module may temporarily store data in a buffer to facilitate comparisons between and/or computations involving data captured at different points in time, such as day-over-day comparisons. Further types of primitive compute modules will occur to those of ordinary skill in the art. Depending on the type and purpose of a primitive compute module, the output of the primitive compute module may be written back onto the primitive bus 106 (e.g., for retrieval therefrom by a down-stream compute module), or provided to another system component (functioning, for purposes of this disclosure, as the ultimate recipient of the processed information). To provide an example of the latter, the primitive compute module may, for instance, write directly to the database; in doing so, it may comply with a partitioning scheme of the database (i.e., a scheme assigning data to different tables, columns, etc.) that differs from the partitioning scheme of the primitive bus 106, whereby the data is effectively re-grouped (compared with its partitioning in to the primitive data streams). As another example, the output of the primitive compute module may be an alert sent to an end-user, e.g., in the form of an email.

Because each primitive compute module operates on the data of only one primitive data stream, primitive compute modules are limited in the types of processing tasks they can perform. For example, if the data is partitioned by metric, computations involving multiple metrics (such as ratios like CPU/tps) are not feasible. Accordingly, in accordance herewith, at least some primitive data streams are routed from the primitive bus to a complex bus for access thereto by one or more complex compute modules, to enable the types of processing tasks that the primitive bus and primitive compute modules cannot handle.

Figure 3:
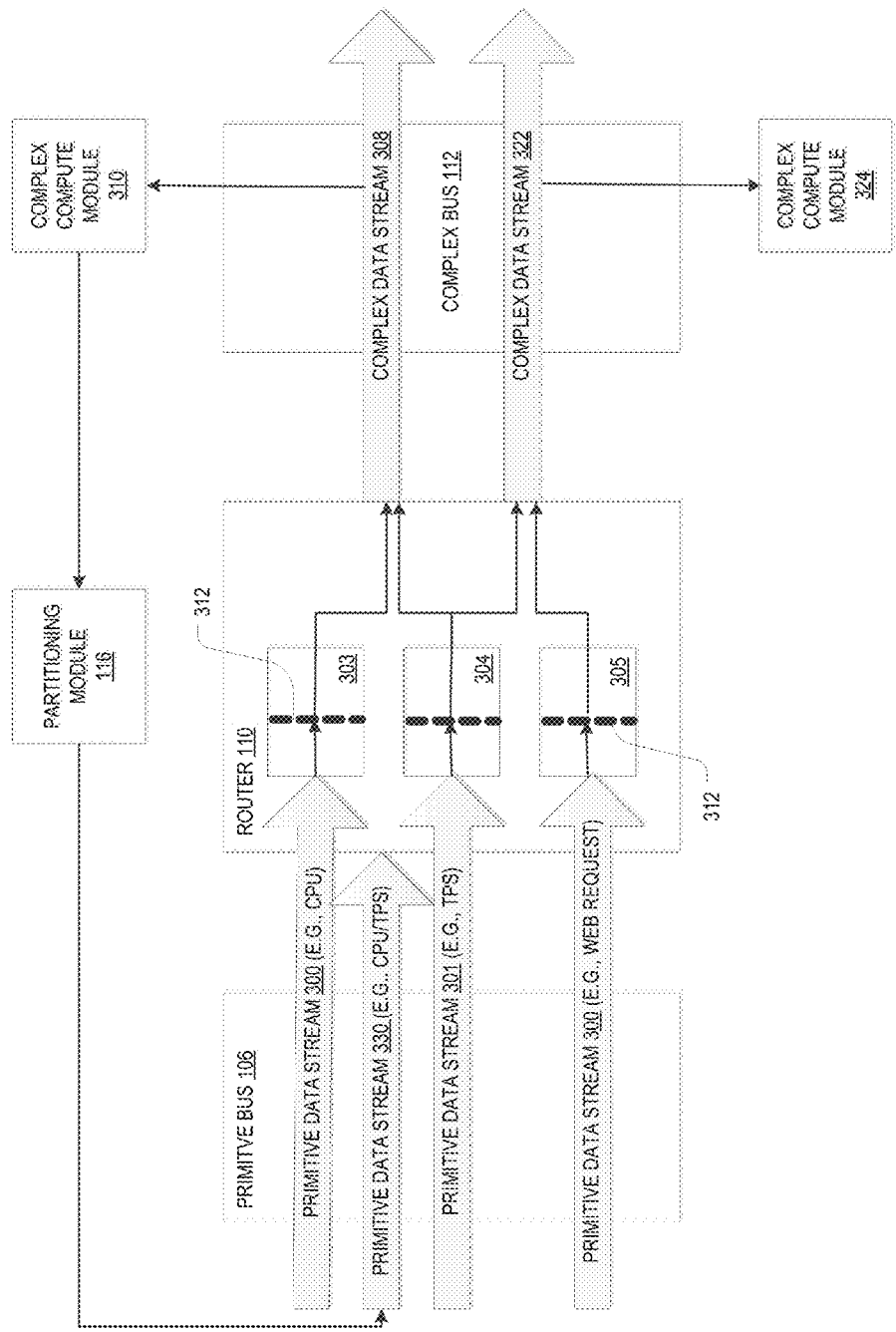
FIG. 3 is a block diagram illustrating in more detail the routing of multiple primitive data streams onto the complex bus of FIG. 1, in accordance with one example embodiment.

Refer now to FIG. 3, which illustrates how multiple primitive data streams can be routed, in accordance with various embodiments, to the same complex compute module to facilitate CEP tasks. In the depicted example, three primitive data streams 300, 301, 302 enter the router 110. (Note that, in contrast to FIG. 2, where the primitive bus carries data partitioned by host, the example illustrated in FIG. 3 uses partitioning by metric.) The router 110 is configured, based on information about the data needs of the complex compute module(s), to create one more complex data streams, each by filtering and combining data from two or more primitive data streams into that complex data stream. To do so, the router 110 may include multiple routing modules connected to different ones of the physical communication channels implementing the primitive bus 106. For example, as shown, the router 110 may include three routing modules 303, 304, 305 connected to the primitive data streams 300, 301, 302, respectively. (Note that, if multiple primitive data streams are carried on the same physical communication channel, they may be input to and routed by a single routing module.) Routing module 303 may route the primitive data stream 300, which may carry CPU data, onto the complex data stream 308 carried on the complex bus 112, and routing module 304, which may carry tps data, may route the primitive data stream 301 onto the same complex data stream 308; in this manner, the complex data stream 308 combines data from two primitive data streams. A complex compute module 310 may connect to the complex data stream 308 to compute the cpu/tps ratio—a processing step that cannot be carried out, in this example, when connecting to a primitive data stream on the primitive bus.

The combination of all data of primitive data streams 300, 301 may be too large to be carried in an individual physical communication channel; indeed, this is one of the reasons to partition the initial incoming data stream 104 into multiple primitive data streams in the first place. Therefore, the routing modules 303, 304 may include filters 312 to reduce the amount of data in each primitive data stream 300, 301 prior to combining them, in a manner that retains all data needed for the desired computation. Assume, for example, that the primitive data streams 300, 301 include CPU and tps data for a large number of hosts, but the cpu/tps ratio is of interest for only a small number of hosts. In this case, the filters 312 may be configured to simply remove the data for hosts that are not of interest. Of course, in some embodiments, the goal is to compute the cpu/tps ratio for all hosts, and the combined cpu and tps data for all hosts may exceed the bandwidth of a single physical communication channel. In this case, the routing modules 303, 304, may filter the primitive data streams 300, 301 in multiple different ways (e.g., based on different host or groups of hosts) and route the differently filtered primitive data streams onto different complex data streams (e.g., one for each host or group of hosts) that collectively contain the same data as the primitive data streams 300, 301. Effectively, this corresponds to partitioning the entirety of the multiple primitive data streams along a second dimension (e.g., host) that is different from the original, "natural" partitioning dimension (e.g., metric). To process the data on multiple complex data streams, multiple complex compute modules may be connected to the respective complex data streams.

As FIG. 3 further illustrates, the router 110 may be configured to create different combinations of the incoming primitive data streams. For example, as shown, routing module 304 may route primitive data stream 301 (including tps data) not only to complex stream 308, but also to a second complex data stream 322, and routing module 305 may route primitive data stream 302, which may include, e.g., web request data, to that same complex data stream 322; both modules 304, 305 may employ suitable filtering to reduce the amount of data from primitive data streams 301, 302 that is combined into the complex data stream 322. One or more complex compute modules 324 may connect to the complex data stream 322 to process the data therein, e.g., by performing calculations on tps and web request data. As will be readily appreciated by those of ordinary skill in the art, the router 110 can include fewer (only one) or more routing modules than depicted to produce generally any number of complex data streams. Further, each routing module operates independently on one or more primitive data streams, routing data to the complex bus with a new and different natural partitioning. In some embodiments, the router 110, or an individual module thereof, is dynamically configurable to combine and filter varying combinations of primitive data streams.

The routing module(s) of the router 110 may be implemented by one or more machines, using hardware components (e.g., computers, network devices, etc.) and software components well-known to and/or readily implemented by those of ordinary skill in the art. For example, in some embodiments, the different router modules are implemented as respective software instances running on the same or different computers. In other embodiments, the routing modules are implemented by special-purpose processing units, which may be programmable and, thus, reconfigured for different complex data streams.

The implementation of, and interaction between, the complex bus 112 and the complex compute modules 114 (e.g., modules 310, 322) is in large part the same as or similar to that of the primitive bus 106 and primitive compute modules 108: The complex bus 112 may be implemented using multiple physical communication channels, each carrying one or more complex data streams, and each complex data stream being carried on only one of the physical communication channels; each complex compute module accesses data of only one of the complex data streams on the complex bus 112; and different complex compute modules 114 may be implemented by different physical compute modules or groups thereof, or share physical compute modules. However, the output of a complex compute module 114 is a primitive data stream generally published not to the complex bus 112, but to the primitive bus 106. For example, with reference to FIG. 3, the output of complex compute module 310, which takes CPU and tps data as input, may be the ratio CPU/tps, which may be published as a new primitive data stream 330 on the primitive bus 106. Note that, in this example, the new primitive data stream 330 fits within the original partitioning scheme (i.e., partitioning by metric), as it carries simply another metric. However, in some embodiments it is also permissible to create new primitive data streams that deviate from the original partitioning; the partitioning of the input data stream 104 is not affected thereby. Further, in some embodiments, the output data of a complex compute module may be written onto an existing primitive data stream as a new sub-primitive data stream (thereby potentially changing the scope of the primitive data stream and, thus, effectively altering the partitioning of the primitive bus). One or more partitioning modules 116 may be used to route the output of the complex compute modules onto a newly created or already existing primitive data stream. Furthermore, in some embodiments, the complex compute modules can also publish data back onto the complex data stream from which they retrieve their input, e.g., for retrieval therefrom by a downstream complex compute module, which may then publish its output back to the primitive bus 106. Complex compute modules need, of course, not create output data streams to be published on a bus. In some embodiments, one or more complex compute modules function as final output modules, writing data directly to a database, user interface, email system, or other end recipient.

Complex compute modules may generally process the complex data streams in any desired manner. Examples of complex compute modules include correlation modules that correlate data of different primitive data streams, calculator modules that compute quantities based on input variables from multiple primitive data streams (e.g., ratios of different metrics), and complex rules modules that evaluate conditions involving data from multiple data streams (e.g., triggering an alarm when two metrics exceed two respective specified thresholds). Various complex compute modules can be implemented using tools and techniques well-known to those of ordinary skill in the art.

Although depicted in FIGS. 1-3 as separate components, in an alternative embodiment, the primitive bus 106, the router 110 and the complex bus 112 may be integrated into a single messaging system. This messaging system may be configured as a hub supporting a large number of topics (e.g., thousands to millions)—one for each of the primitive data streams—that are carried on a generally much smaller number of physical communication channels (e.g., less than ten); the number of topics carried on an individual physical communication channel is generally limited by network bandwidth. In other embodiments, the messaging hub dispenses with the concept of topics (which are explicitly declared), and simply allows subscriptions based on the desired attributes of the data (which are inherent in the data). While the implementation details differ in these embodiments from those of previously described embodiments, the pattern of the primitive and complex computational modules is still present: Primitive compute modules connect to only one of the physical communication channels and subscribe to only one of the topics carried thereon. Complex compute modules connect to two or more (often all or at least a large subset of) physical communication channels, and subscribe to a carefully selected set of topics that span the physical communication channels, but the messaging hub implements hub-side filtering, the total network bandwidth input into the complex compute module does not exceed the capacity of the interface. The output pattern of the primitive and complex compute modules remains the same, with output data going back to a single physical communication channel or being partitioned across multiple physical communication channels. In this embodiment, the two-tier architecture of primitive and complex data streams and associated compute modules may serve to keep the overall organization and routing of sub-data-streams manageable by implementing a partitioning scheme for the primitive data streams that serves most processing needs, while at the same time retaining flexibility to create virtually arbitrary complex data streams to support the less frequent CEP tasks. The integrated messaging system may be inherently scalable: new primitive or complex compute modules can be added, and complex data streams be configured, straightforwardly as long as they are supported by increased capacity provided by added physical communication channels and/or physical compute modules.

Beneficially, the two-tier publish/subscribe architecture described herein may facilitate deploying and/or modifying multiple event-flow programs independently from, and without causing disruption to, each other. To implement a new processing node that operates on the data of a single primitive data stream, or that operates on the data from multiple primitive data streams separately from each other, one or more suitable primitive compute modules need merely be configured and connected to the respective primitive data stream(s). To implement a processing node that operates on data from multiple primitive data streams in conjunction, the router may be configured to combine these primitive data streams into a complex data stream (e.g., by altering the configuration of the routing modules), and one or more suitable complex compute modules may be implemented and connected to the complex data stream. Adding new processing nodes in this manner does not affect communication between the primitive bus and primitive compute modules, or between the complex bus and complex compute modules, that implement different processing nodes. Similarly, deleting existing processing nodes from an event-flow program can be accomplished by simply disconnecting the implementing compute modules, which generally does not affect the operation of other compute modules.

Figure 4:
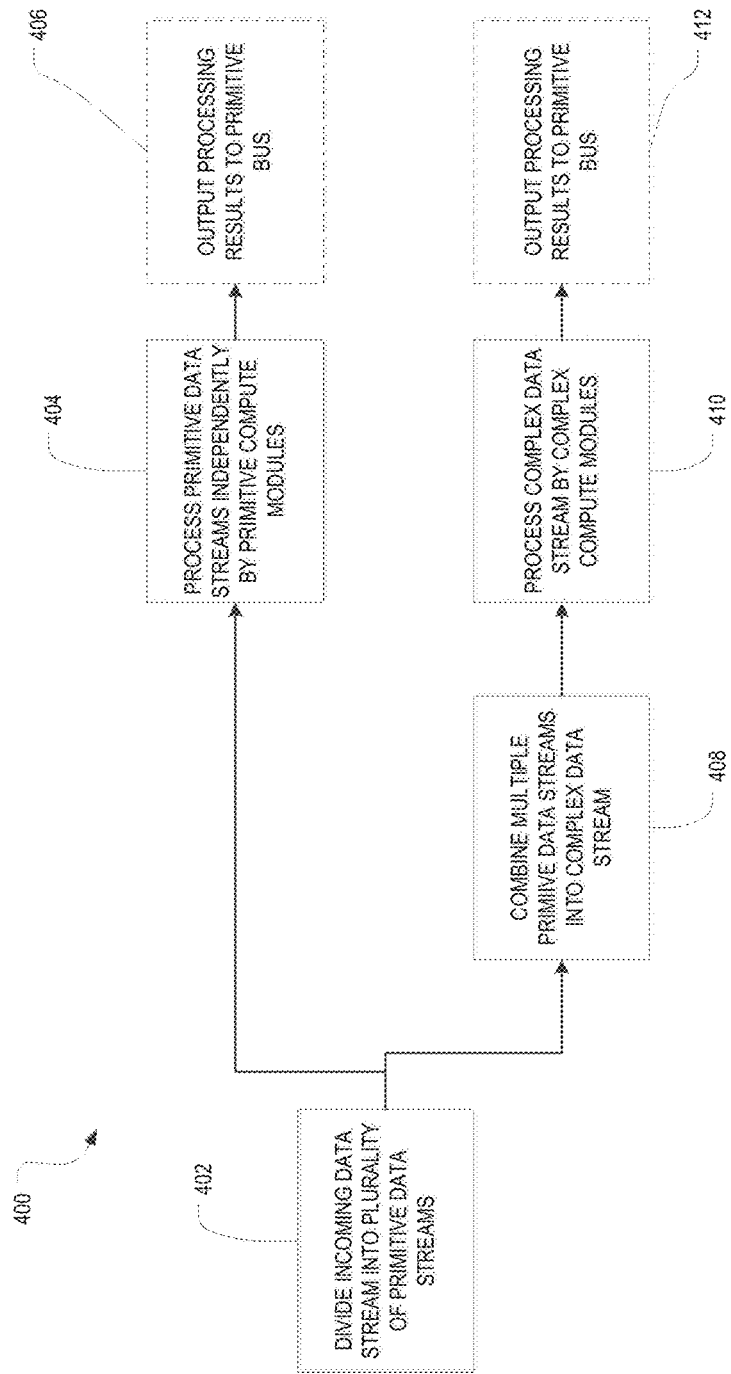
FIG. 4 is a flow chart illustrating a method for processing data streams in accordance with various embodiments.

FIG. 4 illustrates a method 400 for processing data streams in accordance with various embodiments. The method involves dividing an incoming data stream into a plurality of primitive data streams (operation 402), which may be carried, e.g., on a primitive bus. The individual primitive data streams may be processed, independently from each other, by primitive compute modules (operation 404), and any output resulting from the processing may be placed back onto the primitive bus (operation 406). Further, multiple primitive data streams may be combined into a complex data stream (operation 408), e.g., by routing data from the primitive data streams via a suitably configured routing module onto a complex bus. As will be readily apparent from the preceding description, multiple complex data streams may be generated in this manner. The complex data stream(s) may be processed (if there are multiple ones, independently from each other) by one or more complex compute modules (operation 410), and any output data of the complex compute module(s) may be placed onto the primitive bus (operation 412). The operations 402-412 of the method 400 may be carried out repeatedly as long as new data is coming in.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be specially configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
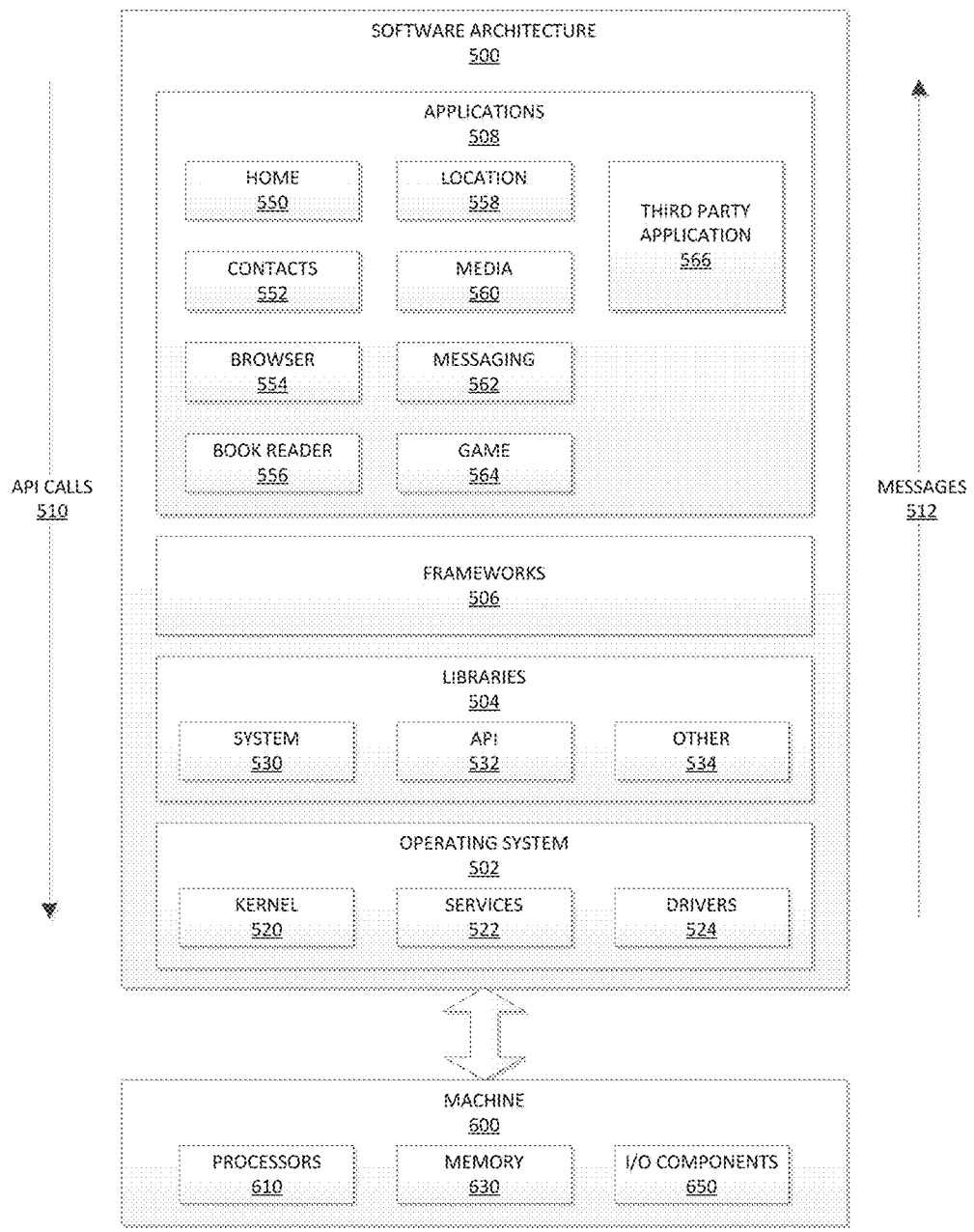
FIG. 5 is a block diagram illustrating an example software architecture in accordance with various embodiments.

FIG. 5 is a block diagram illustrating an architecture of software 500 implementing the methods described herein.

FIG. 5 is merely a non-limiting example of a software architecture and it will be appreciated that many other architectures may be implemented to facilitate the functionality described herein. The software 500 may be executing on hardware such as a machine 600 of FIG. 6 that includes processors 610, memory 630, and I/O components 650. In the example architecture of FIG. 5, the software 500 may be conceptualized as a stack of layers where each layer may provide particular functionality. For example, the software 500 may include layers such as an operating system 502, libraries 504, frameworks 506, and applications 508. Operationally, the applications 508 may invoke application programming interface (API) calls 510 through the software stack and receive messages 512 in response to the API calls 510.

The operating system 502 may manage hardware resources and provide common services. The operating system 502 may include, for example, a kernel 520, services 522, and drivers 524. The kernel 520 may act as an abstraction layer between the hardware and the other software layers. For example, the kernel 520 may be responsible for memory management, processor management (e.g., scheduling), component management, networking, security settings, and so on. The services 522 may provide other common services for the other software layers. The drivers 524 may be responsible for controlling and/or interfacing with the underlying hardware. For instance, the drivers 524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 504 may provide a low-level common infrastructure that may be utilized by the applications 508. The libraries 504 may include system libraries 530 (e.g., C standard library) that may provide functions such as memory allocation functions, string manipulation functions, mathematic functions, and the like. In addition, the libraries 504 may include API libraries 532 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 504 may also include a wide variety of other libraries 534 to provide many other APIs to the applications 508.

The frameworks 506 may provide a high-level common infrastructure that may be utilized by the applications 508. For example, the frameworks 506 may provide various graphic user interface (GUI) functions, high-level resource management, high-level location services, and so forth. The frameworks 506 may provide a broad spectrum of other APIs that may be utilized by the applications 508, some of which may be specific to a particular operating system or platform.

The applications 508 may include a home application 550, a contacts application 552, a browser application 554, a book reader application 556, a location application 558, a media application 560, a messaging application 562, a game application 564, and a broad assortment of other applications such as a third-party application 566. In a specific example, the third-party application 566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 566 may invoke the API calls 510 provided by the operating system to facilitate functionality described herein.

Figure 6:
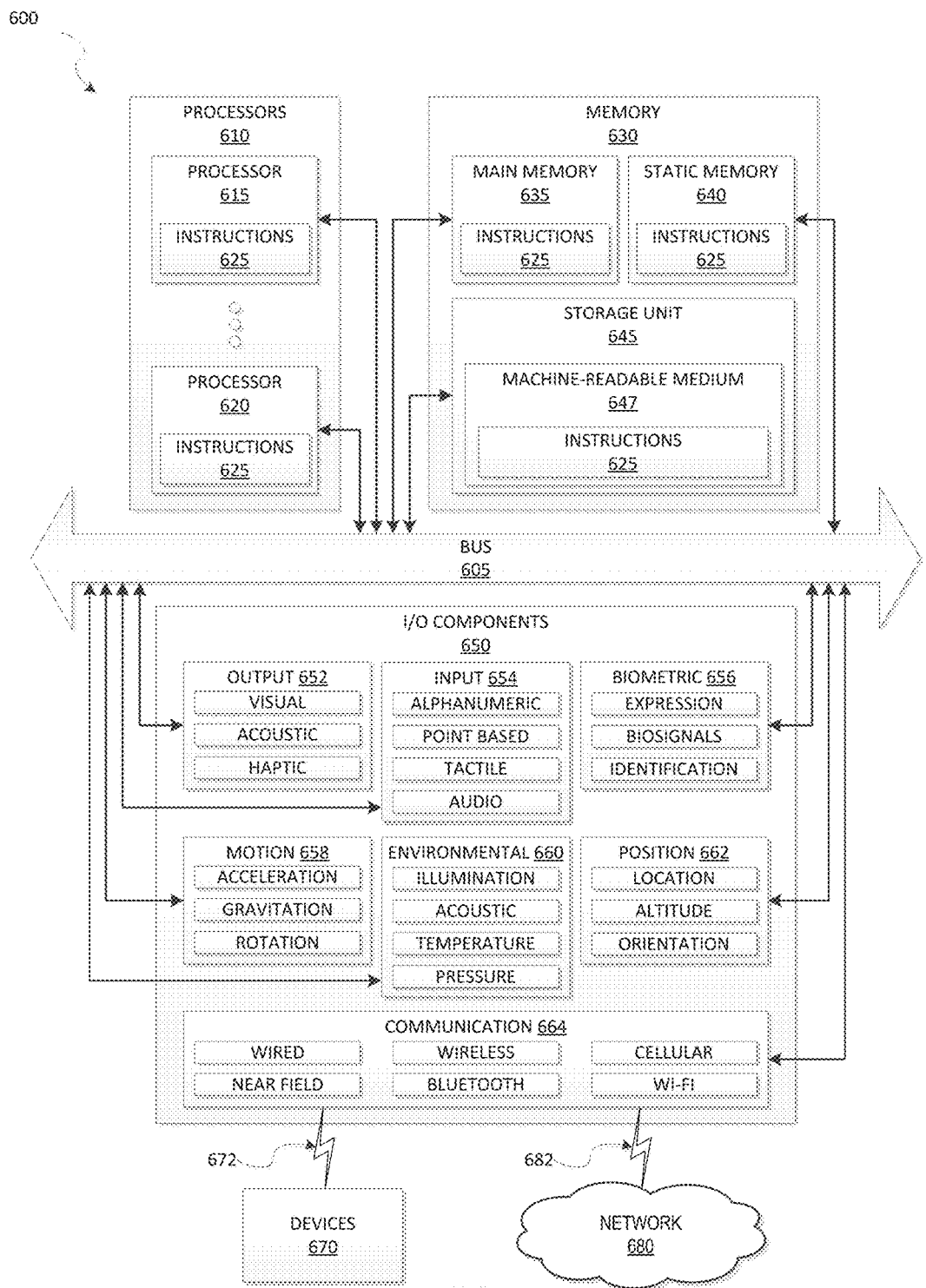
FIG. 6 is a block diagram illustrating an example computer system in accordance with various embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 625 (e.g., software, a program, an application, an applet, an app, or other executable code) for causing the machine 600 to perform any one or more of the methodologies discussed herein may be executed. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 625, sequentially or otherwise, that specify actions to be taken by the machine 600. Further, while only a single machine 600 is illustrated, the term "machine" shall also be taken to include a collection of machines 600 that individually or jointly execute the instructions 625 to perform any one or more of the methodologies discussed herein.

The machine 600 may include processors 610, memory 630, and I/O components 650, which may be configured to communicate with each other via a bus 605. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 615 and a processor 620 that may execute the instructions 625. The term "processor" is intended to include multi-core processor that may comprise two or more independent processors (also referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory 630 may include a main memory 635, a static memory 640, and a storage unit 645 accessible to the processors 610 via the bus 605. The storage unit 645 may include a machine-readable medium 647 on which is stored the instructions 625 embodying any one or more of the methodologies or functions described herein. The instructions 625 may also reside, completely or at least partially, within the main memory 635, within the static memory 640, within at least one of the processors 610 (e.g., within a processor's cache memory), or any suitable combination thereof, during execution thereof by the machine 600. Accordingly, the main memory 635, the static memory 640, and the processors 610 may be considered machine-readable media 647.

As used herein, the term "memory" refers to a machine-readable medium 647 able to store data temporarily or permanently, and may be taken to include, but not be limited to, random-access memory (RAM), read-only memory (ROM), buffer memory, flash memory, and cache memory. While the machine-readable medium 647 is shown in an example embodiment to be a single medium, the term "machine-readable medium" should be taken to include a single medium or multiple media (e.g., a centralized or distributed database, or associated caches and servers) able to store the instructions 625. The term "machine-readable medium" shall also be taken to include any medium, or combination of multiple media, that is capable of storing instructions (e.g., instructions 625) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 650 may include a wide variety of components to receive input, provide and/or produce output, transmit information, exchange information, capture measurements, and so on. It will be appreciated that the I/O components 650 may include many other components that are not shown in FIG. 6. In various example embodiments, the I/O components 650 may include output components 652 and/or input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 650 may include biometric components 656, motion components 658, environmental components 660, and/or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 662 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 and/or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine and/or any of a wide variety of peripheral devices (e.g., a peripheral device coupled via a Universal Serial Bus (USB)).

Moreover, the communication components 664 may detect identifiers and/or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and other optical codes), acoustic detection components (e.g., microphones to identify tagged audio signals), and so on. In additional, a variety of information may be derived via the communication components 664, such as location via Internet Protocol (IP) geo-location, location via Wi-Fi® signal triangulation, location via detecting an NFC beacon signal that may indicate a particular location, and so forth.

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 625 may be transmitted and/or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 625 may be transmitted and/or received using a transmission medium via the coupling 672 (e.g., a peer-to-peer coupling) to the devices 670. The term "transmission medium" shall be taken to include any intangible medium that is capable of storing, encoding, or carrying instructions 625 for execution by the machine 600, and includes digital or analog communications signals or other intangible media to facilitate communication of such software.

Furthermore, the machine-readable medium 647 is non-transitory (in other words, not having any transitory signals) in that it does not embody a propagating signal. However, labeling the machine-readable medium 647 "non-transitory" should not be construed to mean that the medium is incapable of movement; the medium should be considered as being transportable from one physical location to another. Additionally, since the machine-readable medium 647 is tangible, the medium 647 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system for processing data streams, the system comprising:
   a partitioning module configured to partition a multi-dimensional input data stream partitionable based on multiple criteria along at least a first dimension, corresponding to a first criterion, into a plurality of primitive data streams, each of the primitive data streams including multiple sub-primitive data streams differing in at least a second dimension, corresponding to a second criterion, not subject to the partitioning;
   a primitive bus, implemented by first physical communication channels, carrying the plurality of primitive data streams, wherein each of the plurality of primitive data streams is carried on a single one of the first physical communication channels;
   one or more primitive compute modules implemented by first physical compute modules and connected to the first physical communication channels of the primitive bus via network interfaces or receives of the first physical compute modules, each primitive compute module being configured to subscribe to one of the primitive data streams and process that primitive data streams independently of any other primitive data stream;
   a router configured to create a plurality of complex data streams differing from each other in the second dimension by combining, for each of the complex data streams, sub-primitive data streams of two or more primitive data streams into that complex data stream;
   a complex bus, implemented by one or more second physical communication channels, carrying the complex data streams, wherein each of the complex data streams is carried on a single one of the one or more second physical communication channels; and
   one or more complex compute modules implemented by second physical compute modules and connected to the second physical communication channels of the complex bus via network interfaces or receivers of the second physical compute modules, each complex compute module being configured to process one of the one or more complex data streams.

2. The system of claim 1, wherein at least one of the primitive compute modules is further configured to output a result of the processing onto the primitive bus.

3. The system of claim 1, wherein at least one of the complex compute modules is further configured to output a result of the processing onto the primitive bus.

4. The system of claim 1, wherein each of the one or more complex data streams is processed independently of any other complex data stream.

5. The system of claim 1, wherein each of the first physical communication channels carries one or more of the primitive data streams.

6. The system of claim 1, wherein the router comprises one or more filters configured to reduce an amount of data within the two or more primitive data streams prior to the combining.

7. The system of claim 1, wherein the one or more primitive compute modules comprise at least one of a rules module, an aggregation module, an averaging module, or a comparison module.

8. The system of claim 1, wherein the one or more complex compute modules comprise at least one of a correlation module, a calculation module, or a complex rules module.

9. The system of claim 1, wherein at least one of the one or more primitive compute modules or the one or more complex compute modules is configured to write output to a database.

10. The system of claim 1, wherein at least one of the one or more primitive compute modules or the one or more complex compute modules is configured to write output to a message sent to a user.

11. A method for processing data streams, the method comprising:
dividing a multi-dimensional input data stream partitionable based on multiple criteria along at least a first dimension, corresponding to a first criterion, into a plurality of primitive data streams, each of the primitive data streams including multiple sub-primitive data streams differing in at least a second dimension, corresponding to a second criterion, not subject to the partitioning;
carrying the plurality of primitive data streams on a primitive bus implemented by first physical communication channels, wherein each of the plurality of primitive data streams is carried on a single one of the first physical communication channels;
using one or more primitive compute modules implemented by first physical compute modules and connected to the first physical communication channels of the primitive bus via network interfaces or receivers of the first physical compute modules and each of the one or more primitive compute modules subscribing to one of the primitive data streams, processing the subscribed-to primitive data streams, each independently of any other of the primitive data streams;
creating a plurality of complex data streams differing from each other in the second dimension corresponding to a second criterion by combining, for each of the complex data streams, sub-primitive data streams of two or more primitive data streams into that complex data stream;
carrying the complex data stream on a complex bus implanted by one or more second physical communication channels, wherein each of the complex data streams is carried on a single one of the one or more second physical communication channels; and
using one or more complex compute modules implemented by second physical compute modules and connected to the second physical communication channels of the complex bus via network interfaces or receivers of the second physical compute modules and each of the one or more complex compute modules subscribing to one of the complex data streams, processing the subscribed-to one or more complex data streams.

12. The method of claim 11, further comprising writing an output data stream of at least one of the primitive compute modules, resulting from the processing, to the primitive bus.

13. The method of claim 11, further comprising writing an output data stream of at least one of the complex compute module, resulting from the processing, to the primitive bus.

14. The method of claim 11, wherein each of the subscribed-to complex data streams is processed independently of any other complex data stream.

15. The method of claim 11, wherein carrying the plurality of primitive data streams on the primitive bus comprises carrying a first one of the primitive data streams on a first one of the first physical communication channels and carrying a second one of the primitive data streams on a second one of the first physical communication channels.

16. The method of claim 11, wherein processing the subscribed-to primitive data streams comprises at least one of monitoring data of one of the primitive data streams for a specified condition and taking a specified action in response to the condition being met, aggregating data of one the of the primitive data streams over time and performing a computation on the aggregated data, or comparing data of one of the primitive data streams captured at different points in time.

17. The method of claim 11, wherein processing the subscribed-to complex data stream comprises, for at least one of the complex data streams, correlating data of the respective two or more primitive data streams combined into the complex data stream, performing a computation on data of the respective two or more primitive data streams combined into the complex data stream, or monitoring the respective two or more primitive data streams combined into the complex data streams for certain conditions involving at least two of the data streams and taking a specified action in response to the condition being met.

18. The method of claim 11, further comprising writing output of at least one of the primitive or complex compute modules to a database or a message sent to a user.

19. A non-transitory machine-readable medium storing instructions which, when executed by one or more processors of a machine, cause the machine to perform operations comprising:
dividing a multi-dimensional input data stream partitionable based on multiple criteria along at least a first dimension, corresponding to a first criterion, into a plurality of primitive data streams;
carrying the plurality of primitive data streams on a primitive bus implemented by first physical communication channels, wherein each of the plurality of primitive data streams is carried on a single one of the first physical communication channels;
using one or more primitive compute modules implemented by first physical compute modules and connected to the first physical communication channels of the primitive bus via network interfaces or receivers of the first physical compute modules and each of the one or more primitive compute modules subscribing to one of the primitive data streams, processing the subscribed-to primitive data streams, each independently of any other of the primitive data streams;
creating a plurality of complex data streams differing from each other in the second dimension corresponding to a second criterion by combining, for each of the complex data streams, sub-primitive data streams of two or more primitive data streams into that complex data stream;
carrying the complex data streams on a complex bud implemented by one or more second physical communication channels, wherein each of the complex data streams is carried on a single one of the one or more second physical communication channels; and
using one or more complex compute modules implemented by second physical compute modules and connected to the second physical communication channels of the complex bus via network interfaces or receivers of the second physical compute modules and each of the one or more complex compute modules subscribing to one of the complex data streams, processing the subscribed-to one or more complex data streams.

\* \* \* \* \*

UNITED STATES PATENT AND TRADEMARK OFFICE
CERTIFICATE OF CORRECTION

PATENT NO. : 10,057,082 B2
APPLICATION NO. : 14/580114
DATED : August 21, 2018
INVENTOR(S) : Jon Birchard Weygandt et al.

It is certified that error appears in the above-identified patent and that said Letters Patent is hereby corrected as shown below:

In the Claims

In Column 20, Line 47, in Claim 1, delete "receives" and insert -- receivers --, therefor.

In Column 20, Line 51, in Claim 1, delete "streams" and insert -- stream --, therefor.

In Column 21, Lines 1-2, in Claim 1, after "the" delete "one or more".

In Column 21, Line 9, in Claim 4, after "of the" delete "one or more".

In Column 21, Line 65, in Claim 11, delete "stream" and insert -- streams --, therefor.

In Column 21, Line 66, in Claim 11, delete "implanted" and insert -- implemented --, therefor.

In Column 22, Line 16, in Claim 13, delete "module," and insert -- modules, --, therefor.

In Column 22, Line 31, in Claim 16, delete "the of" and insert -- of --, therefor.

In Column 22, Line 36, in Claim 17, delete "stream" and insert -- streams --, therefor.

In Column 23, Line 10, in Claim 19, delete "bud" and insert -- bus --, therefor.

Signed and Sealed this
Fifth Day of March, 2019

Andrei Iancu
*Director of the United States Patent and Trademark Office*